United States Patent [19]

Lewis et al.

[11] Patent Number: 4,492,427
[45] Date of Patent: Jan. 8, 1985

[54] OPTICAL SLIP RING ASSEMBLY

[75] Inventors: Norris E. Lewis, Christiansburg; Michael B. Miller, Blacksburg, both of Va.

[73] Assignee: Litton Systems, Inc., Blacksburg, Va.

[21] Appl. No.: 342,197

[22] Filed: Jan. 25, 1982

Related U.S. Application Data

[63] Continuation-in-part of Ser. No. 241,588, Mar. 9, 1981, Pat. No. 4,436,367.

[51] Int. Cl.³ .............................................. G02B 7/26
[52] U.S. Cl. ................................... 350/96.20; 250/227
[58] Field of Search ............... 350/96.15, 96.20, 96.21, 350/96.22; 250/227

[56] References Cited

U.S. PATENT DOCUMENTS

| 4,027,945 | 6/1977 | Iverson | 350/96.22 |
| 4,107,517 | 8/1978 | Cooper | 250/227 X |
| 4,277,134 | 7/1981 | Upton, Jr. | 350/96.20 |
| 4,278,323 | 7/1981 | Waldman | 350/96.20 |
| 4,373,779 | 2/1983 | Dorsey | 350/96.21 |
| 4,436,367 | 3/1984 | Lewis et al. | 350/96.20 |
| 4,447,114 | 5/1984 | Koene | 350/96.20 |

Primary Examiner—John Lee
Attorney, Agent, or Firm—Brian L. Ribando

[57] ABSTRACT

An optical slip ring assembly couples an optic signal from a rotating source to a stationary detector. The rotor of the optical slip ring comprises rotor optic fibers each having a first end coupled with the optic signal source and a second light-emitting end which is aimed at the stator optic fibers. The stator optic fibers each have a first pickup end mounted in the stator block and are positioned in a radially symmetric array surrounding the rotor. An optic signal transmitted from the source through the rotor fiber is picked up by the stator fibers.

5 Claims, 7 Drawing Figures

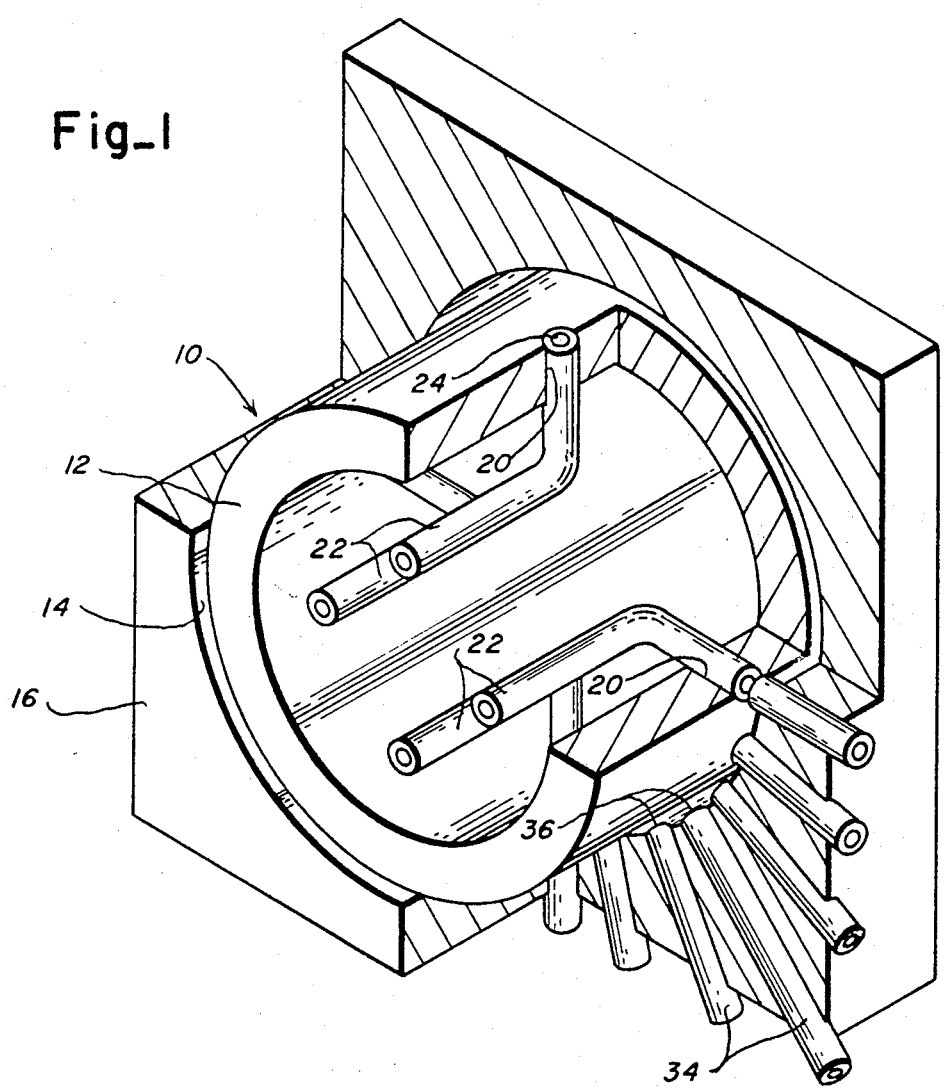
Fig_1
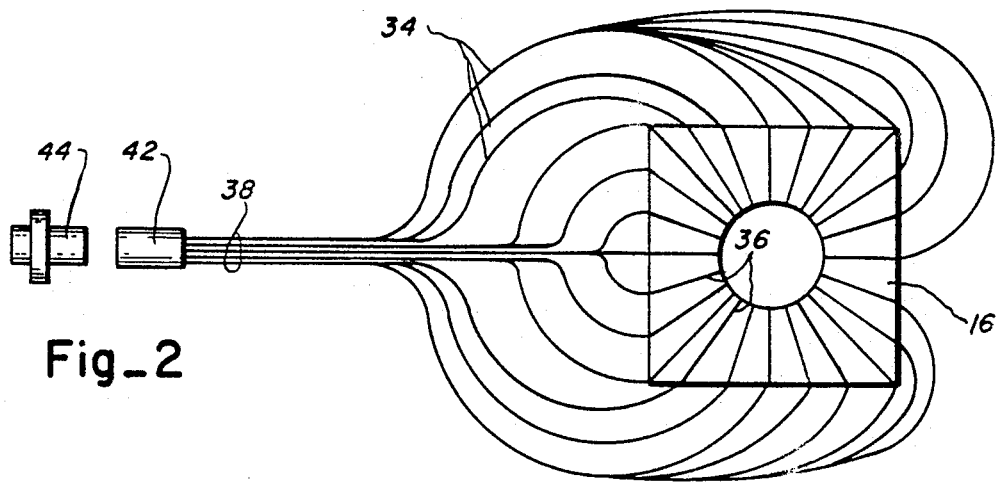
Fig_2

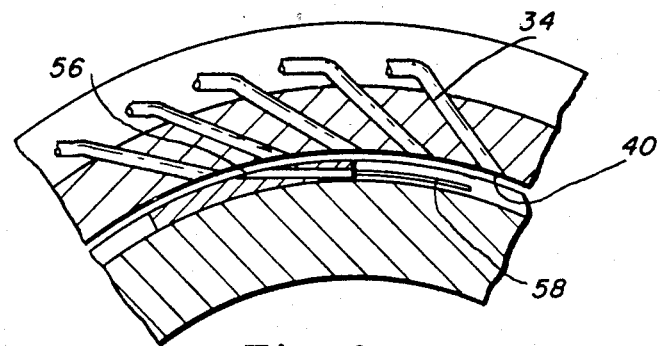
Fig_4
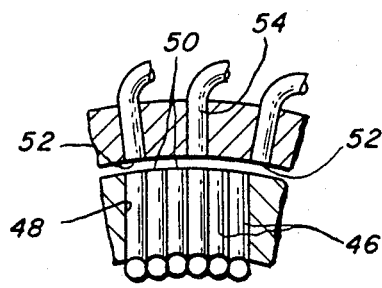
Fig_3
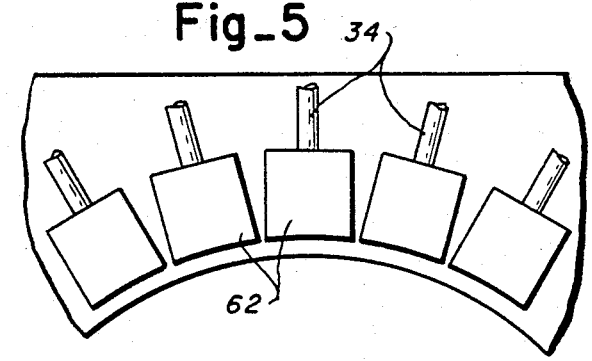
Fig_5
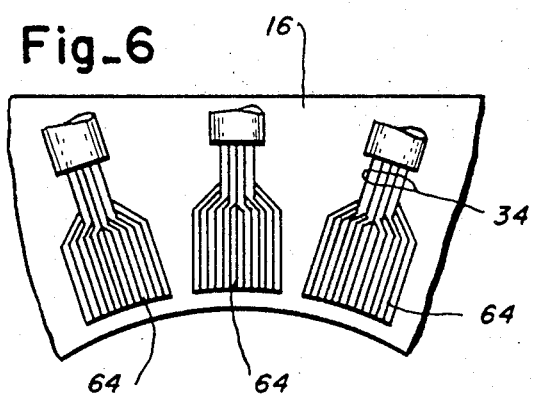
Fig_6
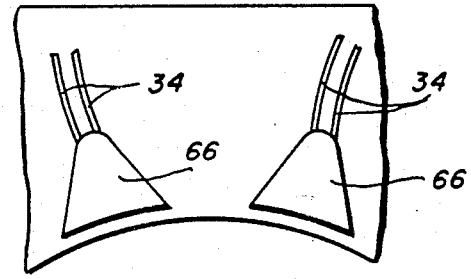
Fig_7

OPTICAL SLIP RING ASSEMBLY

BACKGROUND OF THE INVENTION

This application is a continuation-in-part of copending application Ser. No. 241,588, filed Mar. 9, 1981 (now U.S. Pat. No. 4,436,367).

This invention relates to optical slip ring assemblies.

Rotary optical joints or optical slip rings wherein a pair of optic fibers or fiber bundles are mounted in axial alignment for relative rotation are known in the art. It would be highly desirous to provide an optical slip ring assembly having a cylindrical construction to facilitate the use of multiple optical channels.

OBJECTS OF THE INVENTION AND BRIEF DESCRIPTION OF THE DRAWINGS

It is therefore an object of the present invention to provide a cylindrical optical slip ring assembly wherein an optical signal is radially transmitted between a rotor and stator to produce the optical coupling of the signal therebetween.

Other objects and advantages of the present invention will become apparent from the following portion of this specification and from the accompanying drawings which illustrate, in accordance with the mandate of the patent statutes, a presently preferred embodiment incorporating the principles of the invention.

Referring to the drawings:

FIG. 1 is a perspective view partially sectioned of an optical slip ring assembly according to the teachings of the present invention;

FIG. 2 is a schematic diagram of the stator optics of the optical slip ring assembly;

FIG. 3 is a front view of an alternate embodiment of the rotor assembly;

FIG. 4 is a perspective view partially sectioned of a second alternate embodiment of the rotor assembly; and FIGS. 5, 6, and 7 are partial sectional views of alternate embodiments of the stator assembly.

DESCRIPTION OF THE PREFERRED EMBODIMENT

As can be seen in FIG. 1, the optical slip ring assembly 10 generally comprises a rotor cylinder 12 which is mounted to rotate concentrically within the bore 14 of a stator mounting block 16. The rotor cylinder 12 includes a series of apertures 20 which communicate with the interior of the cylinder. A plurality of optic fibers 22 contained within the rotor cylinder 12, each having one end coupled to a source of optical signals (not shown), have the opposite end positioned in one of the apertures 20 so as to intersect the surface of the rotor cylinder 12 perpendicularly. The end portion 24 of each of the optic fibers 22 which is mounted in the apertures 20 is polished in order to maximize and steer the light signals emanating therefrom. Each optic fiber comprises a plastic or silica core which is sheathed within a plastic or silica cladding as is well known in the art. The entire light-emitting area of the fiber is illuminated by an optic signal transmitted through the fiber 22.

The stator assembly includes a plurality of optic fibers 34, each having a pickup end 36. The pickup ends 36 of the stator fibers 34 are secured to the mounting block 16 in a radially symmetric, inwardly directed array arranged concentrically about a circle defined on the rotor cylinder 12 by the series of apertures 20. The pickup ends 36 thus define a pickup area with the light-emitting end portions 24 of the fibers 22 rotating concentrically therein. Accordingly, an optic signal transmitted from the source through the rotor fibers 22 is picked up by the stator fibers 34. A plurality of stator blocks may be ganged along a common axis to provide a plural channel assembly.

As shown in FIG. 2, the ends of the stator optic fibers 34 which are opposite the pickup ends 36 may be grouped into a bundle 38. A lens 42, which is optically coupled to the bundle 38 focuses the optic signal pickup up by the stator fibers 34 and couples the signal to the optic signal detector 44. In the preferred embodiment, a photo diode serves as a signal detector 44.

In an alternate rotor embodiment, shown in FIG. 3, a plurality of rotor fibers 46 collectively coupled to a source (not shown) are mounted in an elongated aperture 48 in the cylinder 12. The axis of each aperture 48 is perpendicular to the surface of the rotor cylinder, and the light-emitting end portion 50 of each fiber is mounted along the arc of the rotor 12 directly opposite the ends 52 of the stator fibers 54. The rotor fiber ends 50 and the stator fiber ends 52 are arranged so that the rotor fiber ends 50 are always directly opposite two or more of the stator fiber ends 52. In this way, the cross-sectional area of the signal path across the rotor-stator gap remains constant irrespective of the position of the rotor 12.

In another embodiment shown in FIG. 4, the rotor fiber ends 56 intersect the surface of the rotor cylinder at an oblique angle. The stator fibers 34 are also at an oblique angle to match the angle of the rotor fibers. Thus, the stator fiber ends 40 directly face the light emitting ends 56 of the rotor fibers 58.

Alternate embodiments for the stator assembly may be used to enhance the detection capability of the array of pickup fibers. Accordingly, in the embodiment shown in FIG. 4, the stator pickup fibers 34 are selectively angled so that each fiber end 40 directly faces the light-emitting end 56 of the rotor fiber 58.

In the embodiment shown in FIG. 5, graded index rod lenses 62 are used to pick up the optic signal from the rotor assembly and focus the signal directly into each stator fiber 34. This substantially increases the size of the pickup area for the entire fiber array and decreases the amount of signal lost by a misalignment of the rotor and stator.

In the embodiment shown in FIG. 6, groups of stator fibers 34 are formed into blocks 64 with polished faces which enhance the pickup capability of the fibers.

In the embodiment shown in FIG. 7, thin flat wedge-shaped transparent coupler blocks 66 are each coupled to a pair of pickup fibers 34 to define the pickup area 40.

The amount of optic signal intensity lost through the optical coupling is directly related to the size and number of fibers defining the light-emitting area and the size and number of fibers defining the portion of pickup area which is in direct alignment with the light-emitting area. In order to provide a substantially constant strength signal to the detector, the light-emitting area of the rotor assembly and the pickup area of the stator assembly are configured so that the percentage of the light-emitting area, which is in direct alignment with the pickup area, remains substantially constant during the rotation of the rotor within the stator. Thus, the stator fibers cumulatively pick up a substantially uniform signal regardless of the angular position of the rotor.

What is claimed is:

1. An optical slip ring assembly for coupling an optical signal from a rotor to a stator, the slip ring assembly comprising:
    a hollow cylinder comprising said rotor,
    a plurality of apertures through said hollow cylinder, said apertures defining a circle around said rotor,
    a plurality of rotor optic fibers within said hollow cylinder, said rotor optic fibers having signal emitting ends positioned in said apertures and intersecting the surface of said hollow cylinder prependicularly, and
    a plurality of stator optic fibers mounted on said stator, said stator optic fibers having signal receiving ends which collectively define a pickup area and which are arranged concentrically around the circle defined on said rotor by said apertures.

2. The optical slip ring assembly of claim 1 wherein; each of said apertures has an axis which is perpendicular to the surface of said hollow cylinder, and each of said apertures contains a plurality of optic fiber ends arranged side by side along said circle, whereby said side by side ends are directly oposite at least two stator optic fibers for all angular positions of the rotor.

3. An optical slip ring assembly according to claims 1, or 2, wherein said signal receiving ends of said stator fibers each comprises a lens for increasing the optical pickup capacity of each fiber thereby substantially increasing said pickup area.

4. An optical slip ring assembly according to claims 1, or 2, wherein said signal receiving ends are grouped into a radially symmetric array of selectively inwardly directed multistrand fiber blocks which collectively comprise said pickup area.

5. An optical slip ring assembly according to claims 1, or 2, wherein said signal receiving ends include a radially symmetric array of wedge-shaped coupler blocks, each coupled to at least one stator fiber which collectively comprise said pickup area.

* * * * *